F. J. LAPOINTE.
BROACHING MACHINE.
APPLICATION FILED APR. 16, 1915.
1,164,004.
Patented Dec. 14, 1915.
4 SHEETS—SHEET 1.
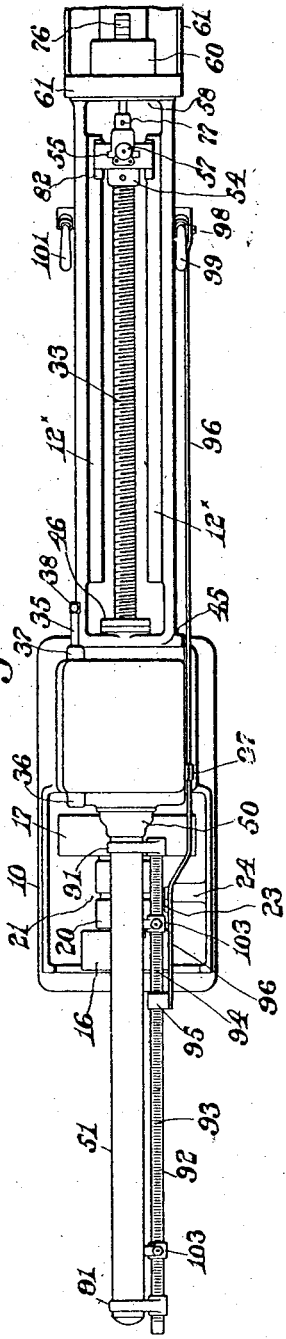
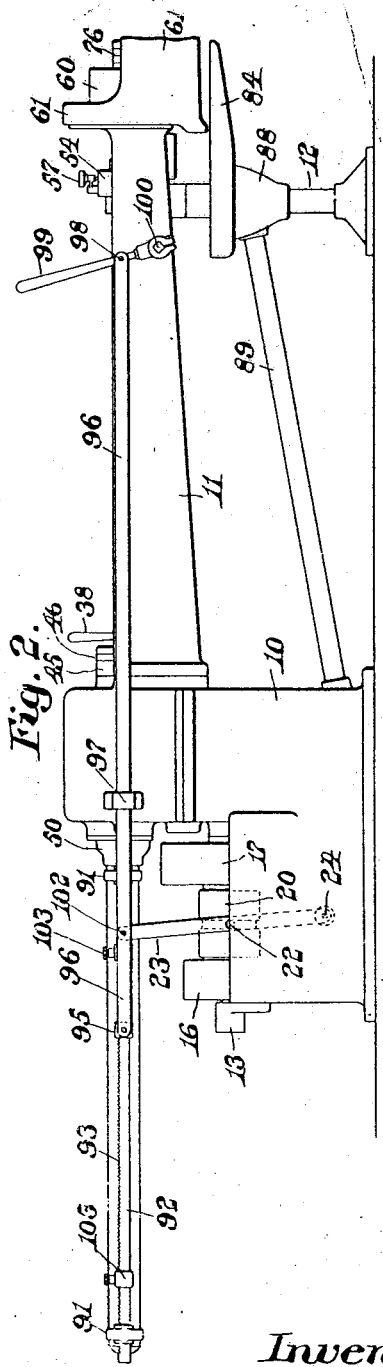
Inventor:
Francis J. Lapointe,
by Walter E. Lombard
Atty

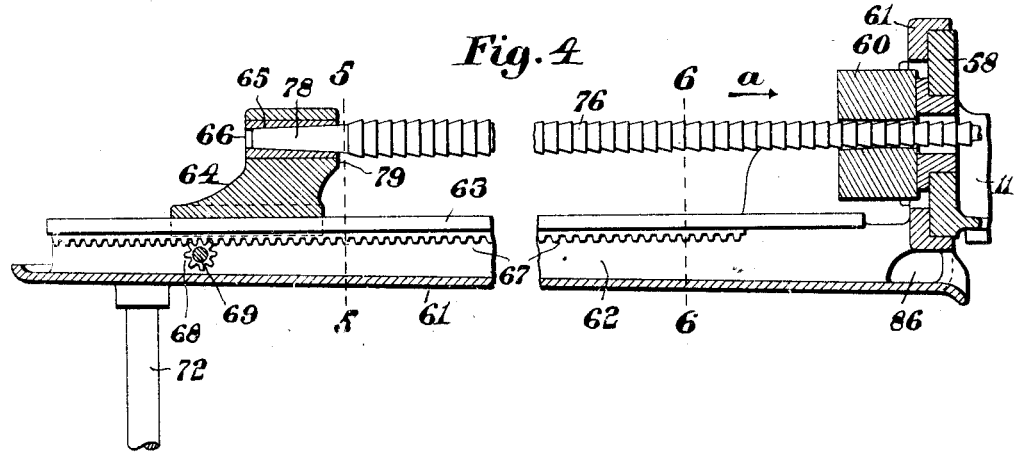

F. J. LAPOINTE.
BROACHING MACHINE.
APPLICATION FILED APR. 16, 1915.

1,164,004.

Patented Dec. 14, 1915.

4 SHEETS—SHEET 3.

Inventor:
Francis J. Lapointe,
by Walter E. Lombard.
Atty

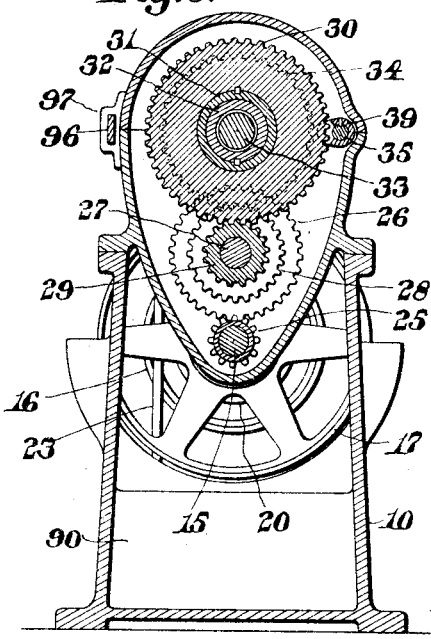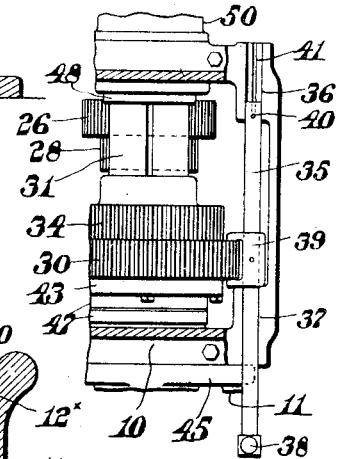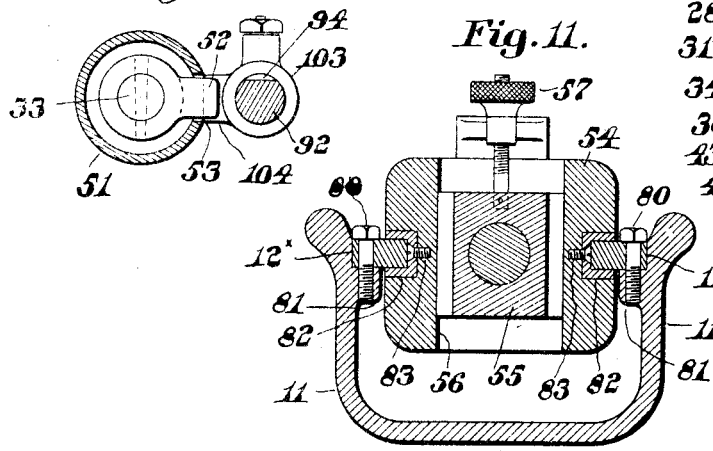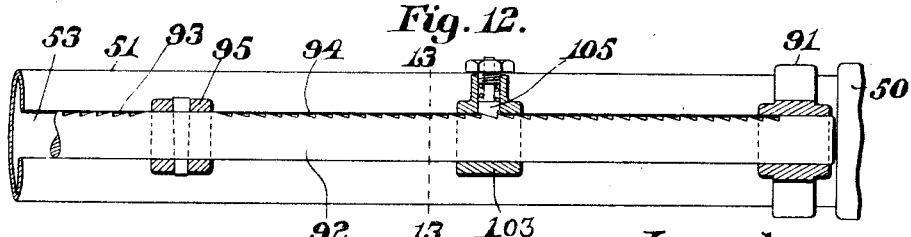

UNITED STATES PATENT OFFICE.

FRANCIS J. LAPOINTE, OF NEW LONDON, CONNECTICUT.

BROACHING-MACHINE.

1,164,004.  Specification of Letters Patent.  Patented Dec. 14, 1915.

Application filed April 16, 1915.  Serial No. 21,881.

*To all whom it may concern:*

Be it known that I, FRANCIS J. LAPOINTE, a citizen of the United States of America, and a resident of New London, in the county of New London and State of Connecticut, have invented certain new and useful Improvements in Broaching-Machines, of which the following is a specification.

This invention relates to broaching machines, and has for one of its objects the production of a machine of this character in which both ends of the cutting tool will be supported while in operation upon the work and which will be simple in construction and effective in operation.

Another object of the invention is to locate the stopping devices of the machine so that they will occupy less space than those heretofore used and where they will not be in the way of the operator.

The invention consists in certain novel features of construction and arrangement of parts which will be fully understood by reference to the description of the drawings and to the claims hereinafter given.

Figure 7:
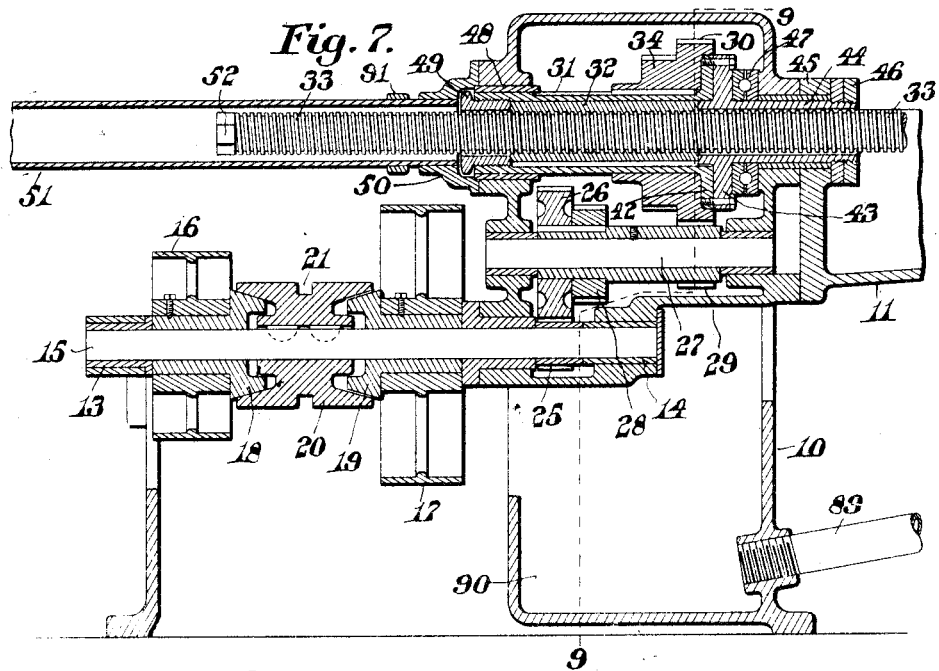
Figure 8:
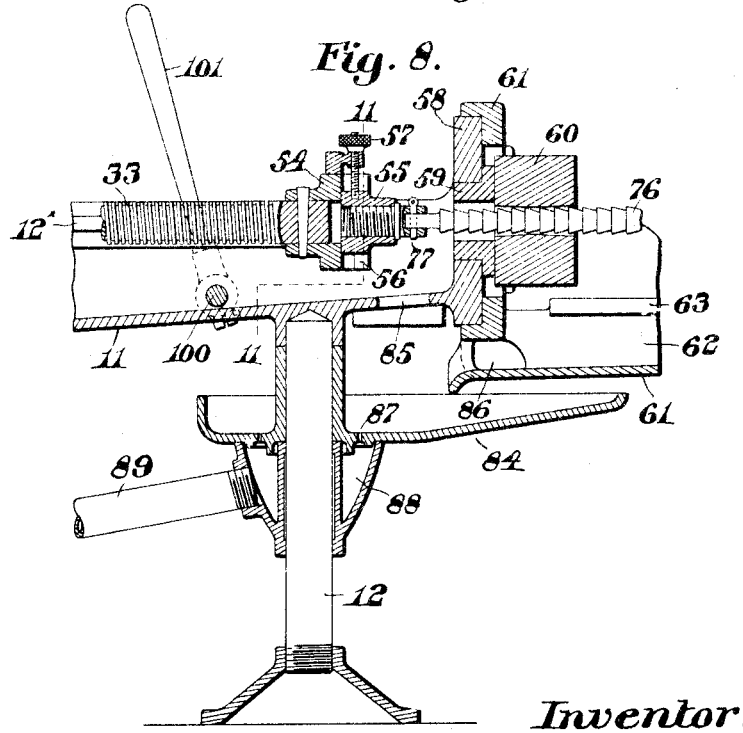

Of the drawings: Figure 1 represents a plan of a machine embodying the principles of the present invention. Fig. 2 represents a longitudinal elevation of the same. Fig. 3 represents a longitudinal elevation of the extension to the main frame carrying the movable support for the outer end of the working tool. Fig. 4 represents a longitudinal vertical section of the same drawn to an enlarged scale. Fig. 5 represents a transverse section of the same, on line 5—5 on Fig. 4, looking to the left thereof. Fig. 6 represents a transverse section of the same, on line 6—6 on Fig. 4, looking to the right thereof. Fig. 7 represents a longitudinal vertical section of the driving mechanism, drawn to an enlarged scale. Fig. 8 represents a longitudinal vertical section of the work supporting end of the machine drawn to an enlarged scale. Fig. 9 represents a transverse vertical section of the same, on line 9—9 on Fig. 7. Fig. 10 represents a partial plan of the driving mechanism, showing the gear shifting device. Fig. 11 represents a transverse vertical section drawn to an enlarged scale, on line 11—11 on Fig. 8. Fig. 12 represents a longitudinal vertical section drawn to an enlarged scale of a portion of the device for stopping the operation of the machine at a predetermined time, and Fig. 13 represents a transverse vertical section of the same, on line 13—13 on Fig. 12.

Similar characters designate like parts throughout the several figures of the drawings.

In the drawings, 10 represents a base provided with a bed frame 11, this bed frame being supported at its outer end by means of a standard 12. The bed frame 11 is open at the top as indicated in the several views of the drawings. The inner face of the side walls of the bed frame 11 is provided with guideways 12<sup>x</sup> extending lengthwise thereof. The frame 10 is provided with suitable bearings 13 and 14 in which is mounted a revoluble shaft 15 having loosely mounted thereon the pulleys 16 and 17 of different diameters. The pulleys 16 and 17 are provided respectively with the cone-shaped hubs 18—19 positioned within the depressions in the ends of the clutch member 20 keyed to and revoluble with the shaft 15. The clutch member 20 is provided with an annular groove 21 therein with which engages a pin 22 on a lever 23 pivoted at 24 to the frame 10. When the lever 23 is moved about its pivot 24 the clutch 20 may be engaged with either of the conical hubs 18 or 19 of the pulleys 16 and 17, thereby permitting rotary movement to be transmitted to the shaft 15 from either the pulley 16 or the pulley 17. Belts (not shown) on the pulleys 16 and 17 are adapted to drive these pulleys in opposite directions. The shaft 15 has also secured thereto a pinion 25 meshing with a gear 26 secured to an intermediate shaft 27 above and parallel to the revoluble shaft 15. Through the gears 25 and 26 rotary movement in either direction is imparted to the shaft 27. The shaft 27 has also secured thereto a pinion 28 and a smaller pinion 29. The latter pinion is adapted to engage a gear 30 splined to and slidable longitudinally of a revoluble sleeve 31 having keyed thereto a nut 32 in which is threaded a nonrevoluble screw 33. The gear 30 has also secured thereto or formed integral therewith a smaller gear 34 adapted to mesh with the pinion 28 on the shaft 27 when the gears 30 and 34 have been moved longitudinally of the sleeve 31. The pinions 28 and 29 are so spaced apart that only one of these at a time will be in mesh with its coacting gear 34 or 30, and in the movement of the gears 30—34 endwise of the sleeve 31 one gear will be removed from mesh with its pinion before the other gear meshes with the pinion with which it coacts. The rotation of the gears 30, 34 will rotate the nut 32 and cause the endwise movement of the screw 33, said nut 32 having no endwise movement.

The gears 30 and 34 are adapted to be moved along the sleeve 31 by means of the shifting rod 35 movable endwise in the bearings 36 and 37 in the frame 10. The shifting member 35 is provided with a handle 38 by which it may be operated and has secured thereto between the bearings 36 and 37 the bifurcated member 39 straddling the gear 30. The rod 35 is provided with a diametral pin 40 extending into a groove 41 in the bearing 36, thereby preventing said rod from rotating about its axis. The sleeve 31 is provided with a flange 42 to which is secured the flange 43 of a tubular member 44 extending through a bearing in the frame 10 and in the end transom 45 of the bed frame 11, said tubular member 44 being secured in position by means of the adjusting nuts 46.

Interposed between the flange 43 and the inner wall of the frame 10 is an antifriction device 47 of any well-known construction, which is adapted to take up any end thrust of the screw 33 when the working tool is in operation.

The opposite end of the sleeve 31 is mounted in the bearing 48 in the frame 10, and the nut 32 is positioned therein by means of the annular member 49 threaded to the inner wall of said sleeve 31, all as shown in Fig. 7 of the drawings.

Secured to the frame 10 is a supporting member 50 from which extends the tubular member 51 in alinement with the axis of the nonrevoluble screw 33. The end of the screw 33 is provided with a lateral finger 52 extending through a slot 53 in the wall of the tubular member 51. The opposite end of the nonrevoluble screw 33 has keyed thereto the carriage 54 having adjustably mounted in its outer end the tool holder 55 adapted to be vertically adjusted in the guideway 56 by means of the adjusting member 57. The end plate 58 of the bed frame 11 is provided with an annular opening in which is positioned the flanged bushing 59 against the outer face of which rests the work 60 to be operated upon.

Secured to the outer face of the end plate 58 is an extension 61. This extension 61 is provided with an upwardly extending central rib 62 having outwardly extending flanges 63 on which is adapted to be reciprocated the tool supporting member 64 having clamped therein a bushing 65 having a tapered bore 66 as indicated in Fig. 4 of the drawings. One of the flanges 63 has formed on its under face or secured thereto a rack 67 with which a pinion 68 is adapted to mesh. This pinion 68 is secured to a revoluble shaft 69 mounted in a bracket 70 secured to the tool supporting member 64. The outer end of the shaft 69 has secured thereto an operating handle 71 by which the pinion 68 may be rotated to cause the tool supporting member 64 to be reciprocated longitudinally of the flanged support 62—63. The outer end of the extension 61 is provided with a support 72, the lower end of which extends into the base 73 and is threaded as at 74. A nut 75 on the threaded portion 74 of the support 72 and resting upon the base 73 may be moved about the axis of the supporting member 72 to level the extension 61.

The axis of the conical bore 66 may be brought into alinement with the tool holder 55 by adjusting the latter by means of the member 57. The smaller end of the working tool 76 extends through the annular bushing 59 and is secured to the tool holder 55 by means of the pin 77, thereby causing the working tool to be moved longitudinally of the bed frame 11 and through the work 60 as the carriage 54 reciprocates on the guideways 12ˣ. The work 60 is previously provided with an opening therethrough to receive the smaller end of the working tool 76.

When long broaching tools 76 are being used, it is quite essential that the other end of the tool should be supported in exact alinement with the tool holder 55. To this end the larger end of the working tool 76 is made cone-shaped as shown at 78 to fit the conical bore 66 of the tool supporting member 64. When a piece of the work is about to be broached, the smaller end of the working tool 76 having been inserted through the rough opening in the work 60 is secured in the tool support 55 of the carriage 54 as indicated in Fig. 8 of the drawings. The operator then, by means of the handle 71, moves the tool supporting member 64 toward the end 58 of the bed frame 11 thereby jamming the bushing 65 onto the conical end 78 of the working tool 76 so firmly that when the working tool is moved with the carriage 54 in the direction of the arrow a on Fig. 4 of the drawings, the tool supporting member 64 will be moved therewith until the face 79 comes into contact with the outer face of the work 60, whereupon the further movement of the tool supporting member 64 will be prevented and the continued movement of the carriage 54 with the working tool 76 will withdraw the conical end 78 from the tool supporting member 64, thus permitting the larger end of the broaching tool to pass through the work. This means of supporting the outer end of the working tool during its operation is of great advantage, as the tool is prevented from chattering and injuring the work being operated upon or doing imperfect work. The guideways 12ˣ in the bed frame 11 are made removable as indicated in Fig. 11 of the drawings, being secured by bolts 80 to ribs 81 extending inwardly from the inner walls of the bed frame 11. These guideways 12ˣ extend into grooved members 82 preferably of bronze fitted into the sides of the carriage 54 and secured in position by the screws 83. This feature is of considerable importance as by the use of the removable guide bars 12ˣ and the shoes 82 the life of the bed frame and the carriage is greatly prolonged, for when the guideways become worn, the bars 12ˣ and the shoes 82 may be replaced with new bars and shoes, making the entire machine as good as new. The support 12 has secured thereto a pan 84 adapted to catch the oil and chips passing through the opening 85 in the bed frame 11.

Any oil collected in the extension 61 is adapted to pass through the opening 86 into this pan 84 and all the oil in the pan is allowed to drip through the small perforations 87 therein into the receptacle 88 from which it is adapted to flow through a pipe 89 into the tank 90 formed in the bottom of the frame 10. The tubular member 51 has brackets 91 secured thereto in which is mounted a rod 92 having two sets of ratchet teeth 93—94 formed in the upper face thereof, each set of teeth having the backs thereof oppositely inclined to the backs of the other set. Intermediate the two sets of teeth 93 and 94, the rod 92 has secured thereto a collar 95 to which is pivotally secured a bar 96 extending through a bearing 97 on the frame 10 and having its opposite end pivotally connected at 98 to an operating lever 99 secured to a shaft 100 adapted to oscillate in bearings in the bed frame 11 and having secured to its opposite end on the other side of said bed frame a similar handle 101. The operating faces of the teeth 93—94 face the collar 95 intermediate the two sets of teeth. To the bar 96 is pivoted at 102 the upper end of the clutch shifting member 23. It is obvious, therefore, that by means of either the handle 99 or 101 the operator can move the bar 96 in its bearing 97 and through the medium of the clutch shifting member 23 cause the engagement of the clutch 20 with either the pulley 16 or 17 to set the driving mechanism in operation either in one direction or the other. This driving mechanism causing the rotation of the sleeve 31 with its nut 32 splined thereto will effect the reciprocation of the nonrevoluble screw 33 with its carriage 54 secured thereto. As the screw 33 moves endwise through the nut 32 the finger 52 will travel lengthwise of the slot 53 in the tubular member 51. On either side of the collar 95 is a stop member 103, this stop member having a projection 104 in the path of movement of the finger 52. The stop member 103 is provided with a spring pressed pawl 105 engaging either of the sets of teeth 93 or 94 on the rod 92. The tension of the spring may be regulated by adjusting the nut threaded to the shank of the pawl 105. The teeth 93 and 94 on either side of the collar 95 are so constructed that the stop members 103 may be readily moved toward the collar to engage with selected teeth, but when once adjusted are prevented from moving away from said collar by the engagement of the pawl 105 with the vertical faces of the teeth 93 and 94. It is obvious, therefore, that as the finger 52 moves along the slot 53 in either direction it will engage with the projection 104 of one of the stop members 103 and cause the rod 92 to be moved in its bearings, thus effecting a movement of the bar 96 and the shifting of the clutch 20 to an intermediate position and stop further operation of the machine.

Either stop member 103 may be moved about the axis of the rod 92 into a position perpendicular to their normal positions as shown in the drawings, said movement causing the pawl 105 to be disengaged from the teeth 93 or 94. When the stop members 103 have been disengaged from the teeth 93—94 in this manner, it is obvious that said stop members may be moved along the rod 92 away from the collar 95 to assume any desired position.

Before starting to operate upon any piece of work the stop member 103 at the left of Fig. 2 of the drawings is adjusted in position along the bar 92 so that at the time of completion of the movement of the working tool 76 through the work the finger 52 will have moved the stop member sufficiently to have stopped the machine. The stop member 103 at the right of the collar 95 as shown in Fig. 2 of the drawings will be similarly positioned on the rod 92 so that at the completion of the return movement of the carriage 54 to its normal position the rod 92 will be moved sufficiently to the right of Fig. 2 of the drawings to again stop the machine preparatory to another operation of the working tool.

Except as hereinbefore described, the operation of the machine is substantially the same as described in Patent No. 1,137,218, issued to me April 27, 1915, and to which reference may be made for the general operation of broaching machines of this character.

It is believed that the operation and many advantages of this invention will be fully understood from the foregoing description.

Having thus described my invention, I claim:

1. In a machine of the class described, the combination of a bed frame; a tool holder adapted to reciprocate lengthwise thereof and consisting in part of a nonrevoluble screw; a nut on said screw; two gears of different diameters on said nut revoluble therewith and slidable lengthwise thereof; a revoluble shaft parallel to said screw; two gears of different sizes keyed to said revoluble shaft and one of which is adapted to mesh with one of the gears on said nut when the latter are moved on said nut in either direction; and means for driving said parallel shaft.

2. In a machine of the class described, the combination of a bed frame; a tool holder adapted to reciprocate lengthwise thereof and consisting in part of a nonrevoluble screw; a nut on said screw; a sleeve keyed to said nut; two gears of different sizes mounted to revolve with said sleeve and move lengthwise thereof; a revoluble shaft parallel with said sleeve; and two separated gears thereon one of which is adapted to mesh with a gear on said sleeve when the gears on said sleeve are moved thereon to the extreme of their movement in either direction.

3. In a machine of the class described, the combination of a bed frame; a tool holder adapted to reciprocate lengthwise thereof and consisting in part of a nonrevoluble screw; a nut on said screw; two gears of different sizes revoluble with said nut and movable lengthwise thereof; a revoluble shaft parallel to said nut; two separated gears revoluble therewith but fixed from end movement, one of said gears being adapted to mesh with one of said nut gears when the latter are moved to the extreme of their movement in either direction; a driven gear on said shaft; a driving shaft provided with a driving gear in mesh with said driven gear; means for shifting said nut gears; pulleys on said driving shaft adapted to be driven in opposite directions; and means slidably mounted on said shaft adapted to be engaged alternately with each of said pulleys, thereby driving said shaft alternately in opposite directions.

4. In a machine of the class described, the combination of a bed frame; a tool holder adapted to reciprocate lengthwise thereof and consisting in part of a nonrevoluble screw; a nut on said screw; two gears of different sizes revoluble with said nut and movable lengthwise thereof; a revoluble shaft parallel to said nut; two separated gears revoluble therewith but fixed from end movement, one of said gears being adapted to mesh with one of said nut gears when the latter are moved to the extreme of their movement in either direction; a driven gear on said shaft; a driving shaft provided with a driving gear in mesh with said driven gear; means for shifting said nut gears; oppositely driven pulleys of different diameters loosely mounted on said shaft; and means keyed to said driving shaft and adapted to be driven by either pulley for revolving said shaft alternately in opposite directions at different speeds.

5. In a machine of the class described, the combination of a bed frame; a tool holder adapted to reciprocate lengthwise thereof and consisting in part of a nonrevoluble screw; a projecting finger on said screw; a clutch for controlling the reciprocation of said tool holder; a clutch shifting mechanism including in part a slidable member parallel to said screw and provided with a plurality of teeth; and a stop member engaging said teeth on said slidable member on each side of said finger.

6. In a machine of the class described, the combination of a bed frame; a tool holder adapted to reciprocate lengthwise thereof and consisting in part of a nonrevoluble screw; a projecting finger on said screw; a clutch for controlling the reciprocation of said tool holder; a clutch shifting mechanism including in part a slidable member parallel to said screw and provided with two sets of ratchet teeth, each set having its teeth oppositely inclined to those in the other set; and a stop member movable lengthwise of each set of teeth and having a pawl engaging said teeth.

7. In a machine of the class described, the combination of a bed frame; a tool holder adapted to reciprocate lengthwise thereof and consisting in part of a nonrevoluble screw; a projecting finger on said screw; a clutch for controlling the reciprocation of said tool holder; a clutch shifting mechanism including in part a slidable member parallel to said screw and provided with two sets of ratchet teeth, each set having its teeth oppositely inclined to those in the other set; and a stop member movable lengthwise of each set of teeth and having a spring pressed pawl engaging said teeth.

8. In a machine of the class described, the combination of a bed frame; a tool holder adapted to reciprocate lengthwise thereof and consisting in part of a nonrevoluble screw; a projecting finger on said screw; a clutch for controlling the reciprocation of said tool holder; a clutch shifting mechanism including in part a cylindrical slidable member parallel to said screw and provided with two sets of ratchet teeth, each set having its teeth oppositely inclined to those in the other set; a collar movable endwise of said cylindrical member opposite each set of teeth and provided with a projection in the path of said finger; and means thereon engaging said teeth preventing movement of said collars toward the ends of said cylindrical member.

9. In a machine of the class described, the combination of a bed frame; a tool holder adapted to reciprocate lengthwise thereof and consisting in part of a nonrevoluble screw; a projecting finger on said screw; a clutch for controlling the reciprocation of said tool holder; a clutch shifting mechanism including in part a cylindrical slidable member parallel to said screw and provided with two sets of ratchet teeth the backs of which are inclined inwardly and in opposite directions from a point intermediate said sets; a collar movable endwise of the toothed portion of said cylindrical member and provided with a projection in the path of said finger; means thereon engaging said teeth normally preventing movement of said collars toward the ends of said cylindrical member but adapted to be disconnected from said teeth to permit said collar to be moved about its axis thereby removing the projection thereon from the path of said fingers.

10. In a machine of the class described, the combination of a bed frame; a tool holder adapted to reciprocate lengthwise thereof and consisting in part of a nonrevoluble screw; a projecting finger thereon; a clutch for controlling the reciprocation of said tool holder; a clutch shifting lever; a slidable bar pivotally connected to the outer end of said lever; a rod reciprocable in bearings to which said bar is connected at a point intermediate its ends and provided with two sets of ratchet teeth on opposite sides of said connection, each set having its teeth oppositely inclined to those in the other set; and a stop member on each end of said rod freely movable toward said connection but prevented from moving outwardly therefrom.

11. In a machine of the class described, the combination of a bed frame; a tool holder adapted to reciprocate lengthwise thereof and consisting in part of a nonrevoluble screw; a tubular inclosure for said screw having a slot extending lengthwise thereof; a finger secured to said screw and extending through said slot; a clutch for controlling the reciprocation of said tool holder; and a clutch shifting mechanism including stop members on opposite sides of said finger and in the path of movement thereof.

12. In a machine of the class described, the combination of a bed frame; a tool holder adapted to reciprocate lengthwise thereof and consisting in part of a nonrevoluble screw; a tubular inclosure for said screw having a slot extending lengthwise thereof; a finger secured to said screw and extending through said slot; a clutch for controlling the reciprocation of said tool holder; two bearings secured to opposite ends of said inclosure; a rod movable endwise therein; stop members thereon in the path of said finger; and a clutch shifting device connected to said rod at a point intermediate said stop members.

13. In a machine of the class described, the combination of a bed frame; a tool holder adapted to be reciprocated lengthwise thereof; a support adjacent to the work supporting end of said bed frame and provided with guideways parallel with the path of said tool holder; and a reciprocable member on said support provided with means for frictionally engaging the outer end of the working tool, and means for moving said reciprocable member into frictional engagement with the outer end of the working tool, whereby said member is adapted to be freely moved toward said bed frame by and in unison with said tool and disengaged from said tool by contact with the work being operated upon.

14. In a machine of the class described, the combination of a bed frame; a tool holder adapted to be reciprocated lengthwise thereof; an extension frame secured to the work supporting end of said bed frame provided with an immovable rack; a carriage movable lengthwise of said extension frame independently of said tool holder and adapted to be moved in unison therewith when supporting the outer end of the working tool; a pinion carried by said carriage and meshing with said rack; and means for rotating said pinion.

15. In a machine of the class described, the combination of a bed frame; a tool holder adapted to be reciprocated lengthwise thereof; an extension frame secured to the work supporting end of said bed frame provided with an immovable rack; a carriage movable lengthwise of said extension frame having a split bearing; a bushing for said bearing adapted to support the outer end of the operating tool; means for clamping said bearing on said bushing; a pinion carried by said carriage and meshing with said rack; and means for rotating said pinion.

16. In a machine of the class described, the combination of a bed frame; a tool holder adapted to be reciprocated lengthwise thereof; an extension frame secured to the work supporting end of said bed frame provided with an immovable rack; a carriage movable lengthwise of said extension frame independently of said tool holder and having a split bearing; a bushing for said bearing having a tapered bore adapted to support the outer end of the operating tool; means for clamping said bearing on said bushing; a pinion carried by said carriage and meshing with said rack; and means for rotating said pinion.

17. In a machine of the class described, the combination of a bed frame; a tool holder adapted to be reciprocated lengthwise thereof; an extension frame secured to the work supporting end of said bed frame and provided with a T-shaped central rib having a rack on the under face of one of the flanges thereof; a carriage movable lengthwise of said rib independently of said tool holder but adapted to move in unison therewith when supporting the outer end of the operating tool; a pinion carried by said carriage and meshing with said rack; means for rotating said pinion; and a bushing secured in said carriage having a tapered bore adapted to receive and support the outer end of the working tool.

18. In a machine of the class described, the combination of a bed frame; a tool holder adapted to be reciprocated lengthwise thereof; an extension frame secured to the work supporting end of said bed frame provided with an immovable rack; a carriage movable lengthwise of said extension frame independently of said tool holder and adapted to be moved in unison therewith when supporting the outer end of the working tool, said carriage being provided with a socket to receive the outer end of the working tool and frictionally engage therewith; a pinion carried by said carriage and meshing with said rack; and means for rotating said pinion.

Signed by me at New London, Connecticut, this 12th day of April, 1915.

FRANCIS J. LAPOINTE.

Witnesses:
MALCOLM M. SCOTT,
MARTIN J. CULLIN.